US012144066B2

(12) United States Patent
Lipowicz

(10) Patent No.: US 12,144,066 B2
(45) Date of Patent: *Nov. 12, 2024

(54) E-VAPOR DEVICE INCLUDING A COMPOUND HEATER STRUCTURE

(71) Applicant: Altria Client Services LLC, Richmond, VA (US)

(72) Inventor: Peter Lipowicz, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/165,587

(22) Filed: Feb. 7, 2023

(65) Prior Publication Data

US 2023/0199916 A1 Jun. 22, 2023

Related U.S. Application Data

(63) Continuation of application No. 15/166,450, filed on May 27, 2016, now Pat. No. 11,589,427.

(Continued)

(51) Int. Cl.
*A24F 40/44* (2020.01)
*A24F 40/46* (2020.01)

(Continued)

(52) U.S. Cl.
CPC ............... *H05B 3/16* (2013.01); *A24F 40/44* (2020.01); *A24F 40/46* (2020.01); *A24F 40/10* (2020.01); *H05B 2203/014* (2013.01)

(58) Field of Classification Search
CPC .......... A24F 40/10; A24F 40/44; A24F 40/46; A24F 47/00; A24F 47/002; A24F 47/004; A24F 47/008
See application file for complete search history.

(56) References Cited

U.S. PATENT DOCUMENTS 5,078,844 A 1/1992 Katsuma
5,224,498 A 7/1993 Deevi et al.
(Continued)

FOREIGN PATENT DOCUMENTS

CN 203314107 U 12/2013
CN 203986095 U 12/2014
(Continued)

OTHER PUBLICATIONS

Korean Office Action for corresponding Application No. 10-2017-7037917, dated Jul. 18, 2023, with English Translation.
(Continued)

*Primary Examiner* — Trong H Nguyen
*Assistant Examiner* — Ayub A Maye
(74) *Attorney, Agent, or Firm* — HARNESS, DICKEY & PIERCE, P.L.C.

(57) ABSTRACT

An e-vapor device may include a pre-vapor sector and a heater structure arranged in thermal contact with the pre-vapor sector. The pre-vapor sector includes a reservoir and a dispensing interface. The pre-vapor sector is configured to hold and dispense a pre-vapor formulation. The heater structure is configured to vaporize the pre-vapor formulation to generate a vapor. The heater structure includes a base wire and a heater wire coiled around the base wire. The base wire is insulated from the heater wire. As a result of the heater design, the heater structure is stiffer and more robust than other related heaters in the art, thus allowing more options for its implementation.

18 Claims, 7 Drawing Sheets

Related U.S. Application Data

(60) Provisional application No. 62/169,082, filed on Jun. 1, 2015.

(51) Int. Cl.

*H05B 3/16* (2006.01)
*A24F 40/10* (2020.01)

(56) References Cited

U.S. PATENT DOCUMENTS

| | | | |
|---|---|---|---|
| 5,573,692 | A | 11/1996 | Das et al. |
| 5,878,752 | A | 3/1999 | Adams et al. |
| 5,944,025 | A | 8/1999 | Cook et al. |
| 8,997,753 | B2 | 4/2015 | Li et al. |
| 9,352,288 | B2 | 5/2016 | Terry et al. |
| 10,721,965 | B2 | 7/2020 | Lipowicz |
| 2011/0155153 | A1 | 6/2011 | Thorens et al. |
| 2011/0226236 | A1 | 9/2011 | Buchberger |
| 2013/0192615 | A1 | 8/2013 | Tucker et al. |
| 2013/0192623 | A1 | 8/2013 | Tucker et al. |
| 2013/0213419 | A1 | 8/2013 | Tucker et al. |
| 2013/0220316 | A1 | 8/2013 | Oglesby et al. |
| 2014/0026947 | A1 | 1/2014 | Giordano et al. |
| 2014/0060554 | A1 | 3/2014 | Collett et al. |
| 2014/0109905 | A1 | 4/2014 | Yamada et al. |
| 2014/0130816 | A1 | 5/2014 | Liu |
| 2014/0150783 | A1 | 6/2014 | Liu |
| 2014/0182608 | A1 | 7/2014 | Egoyants et al. |
| 2014/0186015 | A1 | 7/2014 | Breiwa, III et al. |
| 2014/0187972 | A1 | 7/2014 | Burkett |
| 2015/0027471 | A1 | 1/2015 | Feldman et al. |
| 2015/0181934 | A1 | 7/2015 | Lyubomirskiy et al. |
| 2016/0143361 | A1 | 5/2016 | Juster et al. |
| 2018/0140014 | A1 | 5/2018 | Yu et al. |
| 2019/0099561 | A1 | 4/2019 | Nettenstrom |
| 2021/0251298 | A1 | 8/2021 | Qiu et al. |
| 2023/0189893 | A1 | 6/2023 | Xie et al. |
| 2023/0284696 | A1 | 9/2023 | Nelson et al. |
| 2024/0023609 | A1 | 1/2024 | Wen et al. |

FOREIGN PATENT DOCUMENTS

| | | | |
|---|---|---|---|
| CN | 203986096 | U | 12/2014 |
| CN | 104770895 | A | 7/2015 |
| DE | 3832342 | C1 | 7/1989 |
| EA | 201100197 | A1 | 3/2012 |
| EA | 019736 | B1 | 5/2014 |
| GB | 833784 | A | 4/1960 |
| JP | 2013-541968 | A | 11/2013 |
| JP | 2014216287 | A | 11/2014 |
| RU | 138386 | U1 | 3/2014 |
| WO | WO-98/16088 | A1 | 4/1998 |
| WO | WO-2012/033421 | A1 | 3/2012 |
| WO | WO-2013/027249 | A1 | 2/2013 |
| WO | WO-2013/098411 | A1 | 7/2013 |

OTHER PUBLICATIONS

U.S Notice of Allowance for U.S. Appl. No. 16/923,460, dated Feb. 14, 2023.
U.S Notice of Allowance for U.S. Appl. No. 18/320,659, dated Jun. 20, 2024.
Korean Notice of Allowance dated May 23, 2024 for corresponding Korean Patent Application No. 10-2017-7037917 and its English-language translation.
International Search Report and Written Opinion issued in International Application No. PCT/EP2016/068089, mailed Oct. 19, 2016.
Office Action for corresponding U.S. Appl. No. 15/208,969 dated Apr. 18, 2019.
Office Action for corresponding U.S. Appl. No. 15/208,969 dated Oct. 28, 2019.
Russian Office Action dated Dec. 17, 2019 for corresponding Russian application No. 2017145592.
U.S. Notice of Allowance dated Apr. 2, 2020 for corresponding U.S. Appl. No. 15/208,969.
Chinese Office Action and Search Report dated Mar. 18, 2020 for corresponding Chinese Application No. 201680040137.7.
Russian Notice of Allowance dated Apr. 15, 2020 for corresponding Russian Application No. 2017145592/03(078057).
Office Action for U.S. Appl. No. 15/166,450 dated Aug. 6, 2020.
Office Action for EP Application No. 16 753 282.9 dated Aug. 5, 2020.
Japanese Office Action dated Sep. 23, 2020, issued in corresponding Japanese Application No. 2018-504776.
Office Action dated Oct. 21, 2020 issued in corresponding Israeli Patent Application No. 255610.
Second Office Action issued Nov. 19, 2020 in Chinese Application No. 201680040137.7.
Japanese Notice of Allowance dated Jun. 7, 2021 for corresponding Japanese Application No. 2018-504776.
Office Action for corresponding U.S. Appl. No. 16/923,460, dated Sep. 15, 2022.
Office Action for corresponding U.S. Appl. No. 18/320,659, dated Dec. 21, 2023.
Korean Office Action for Korean Application No. 10-2017-7037917 and English translation thereof mailed Jan. 29, 2024.

E-VAPOR DEVICE INCLUDING A COMPOUND HEATER STRUCTURE

CROSS-REFERENCE TO RELATED APPLICATIONS

This application is a continuation under 35 U.S.C. § 120 of U.S. application Ser. No. 15/166,450, filed May 27, 2016, which claims priority under 35 U.S.C. § 119 to U.S. Provisional Application No. 62,169,082, filed Jun. 1, 2015, the entire contents of which are hereby incorporated herein by reference.

BACKGROUND

Field

The present disclosure relates to e-vapor devices and heater structures for such devices.

Description of Related Art

Electronic vapor devices are electrically-powered articles configured to vaporize a pre-vapor formulation for the purpose of producing a vapor that is drawn through an outlet of the device when a negative pressure is applied. Electronic vapor devices may also be referred to as e-vapor devices or e-vaping devices. An e-vapor device includes a reservoir configured to hold the pre-vapor formulation, a wick that is arranged in communication with the pre-vapor formulation, a heating element that is arranged in thermal proximity to the wick, and a power source configured to supply electricity to the heating element. The heating element may be in a form of a relatively thin wire that is coiled a plurality of times around the wick. Accordingly, when a current is supplied to the heating element during the operation of the e-vapor device, the wire undergoes resistive heating to vaporize the pre-vapor formulation in the wick to produce a vapor that is drawn through an outlet of the device when a negative pressure is applied.

SUMMARY

An e-vapor device may include a pre-vapor sector and a heater structure arranged in thermal contact with the pre-vapor sector. The pre-vapor sector is configured to hold and dispense a pre-vapor formulation. The heater structure is configured to vaporize the pre-vapor formulation to generate a vapor. The heater structure includes a base wire and a heater wire coiled around the base wire. The base wire is insulated from the heater wire. In an example embodiment, the base wire is electrically insulated (but not thermally insulated) from the heater wire.

The pre-vapor sector may include a reservoir and a dispensing interface. The dispensing interface may include an absorbent material that is arranged in fluidic communication with the heater structure. The absorbent material may be a wick having an elongated form and arranged in fluidic communication with the reservoir.

The heater structure may be ring-shaped or C-shaped, the wick extending through the heater structure. For instance, the heater structure may be in a shape of a toroidal inductor. The heater structure may also be arranged so as to apply a spring force against the dispensing interface. The heater structure may have a yield strength ranging from 50 to 600 MPa.

The base wire of the heater structure has a first diameter, and the heater wire has a second diameter, the first diameter being greater than the second diameter. The ratio of the first diameter to the second diameter may range from 2:1 to 4:1.

The base wire of the heater structure may be an anodized wire. In an example embodiment, the anodized wire may be an object wire coated with an anodic layer. The object wire may be an aluminum wire, a titanium wire, a zinc wire, a magnesium wire, a niobium wire, a zirconium wire, a hafnium wire, or a tantalum wire. The anodic layer has a dielectric strength of at least 150 V/m. The anodic layer may have a thickness ranging from 500 to 10,000 nm.

Alternatively, the base wire of the heater structure may be a transition metal-based wire coated with vitreous enamel. The transition metal-based wire may be a nickel wire, a nickel-chromium wire, or a stainless steel wire.

The heater wire may have a resistivity ranging from 0.5 to 1.5 μΩ·m. The heater wire may be formed of a nickel-chromium alloy.

A method of generating a vapor for an e-vapor device may include thermally contacting a pre-vapor sector within the e-vapor device with a heater structure. The heater structure includes a base wire and a heater wire coiled around the base wire. The base wire is insulated from the heater wire. In an example embodiment, the base wire is electrically insulated (but not thermally insulated) from the heater wire.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
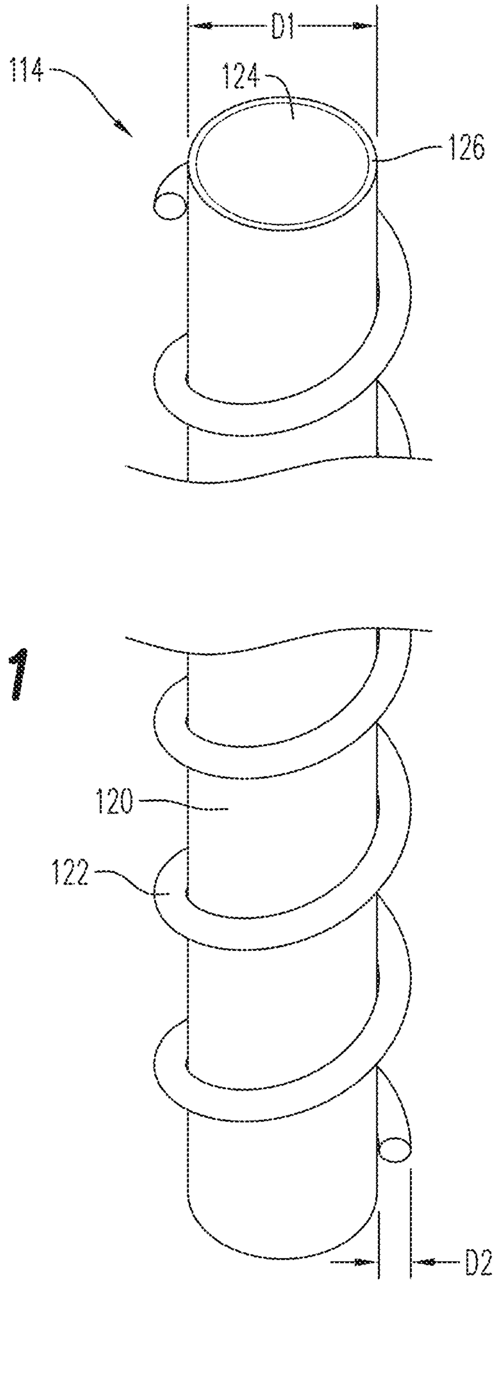
FIG. 1 is a partial, perspective view of a heater structure according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to"

another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a partial, perspective view of a heater structure according to an example embodiment. Referring to FIG. 1, the heater structure 114 is a compound arrangement in that the heater structure 114 is composed of at least two different components or constituent parts. As a result of the heater design, the heater structure 114 is stiffer and more robust than other related heaters in the art, thus allowing more options for its implementation. Additionally, because FIG. 1 is only a partial view of the heater structure 114, it should be understood that the heater structure 114 may have various lengths and forms when implemented for its intended purpose.

The heater structure 114 may be utilized in an e-vapor device. In particular, the heater structure 114 may be arranged so as to be in thermal contact with a pre-vapor sector of the e-vapor device, wherein the pre-vapor sector is configured to hold and dispense a pre-vapor formulation. A pre-vapor formulation is a material or combination of materials that may be transformed into a vapor. For example, the pre-vapor formulation may be a liquid, solid, and/or gel formulation including, but not limited to, water, beads, solvents, active ingredients, ethanol, plant extracts, natural or artificial flavors, and/or vapor formers such as glycerine and propylene glycol. In an example embodiment, the pre-vapor formulation may be an e-liquid that is held and dispensed by a liquid sector. During the operation of the e-vapor device, the heater structure 114 is configured to vaporize the pre-vapor formulation to generate a vapor that is drawn through an outlet of the device (e.g., in response to the application of a negative pressure).

As shown in FIG. 1, the heater structure 114 includes a base wire 120 and a heater wire 122 coiled around the base wire 120. The base wire 120 has a first diameter D1, and the heater wire 122 has a second diameter D2. The first diameter D1 is greater than the second diameter D2. For instance, a ratio of the first diameter D1 to the second diameter D2 may range from 2:1 to 4:1, although example embodiments are not limited thereto. In particular, the base wire 120 is configured to function as a structural foundation for the heater structure 114, so the first diameter D1 may vary depending on the material used and the desired strength and/or resilience sought therefrom. Additionally, the heater wire 122 is configured to generate the heat emitted by the heater structure 114 for vaporizing the pre-vapor formulation, so the second diameter D2 may vary depending on the material used and the desired resistive heating sought therefrom. As a result, it should be understood that other diameter ratios are possible, depending on the materials used to form the base wire 120 and the heater wire 122 and the respective properties afforded by those materials.

To operate the heater structure 114, one end of the heater wire 122 is connected to a positive terminal of a power source (e.g., battery), while the opposing end of the heater wire 122 is connected to a negative terminal of the power source. When a current is supplied to the heater wire 122, heat is generated (as a result of the passage of the current therethrough) by Joule heating, which is also referred to in the art as ohmic heating or resistive heating. In particular, an electric current passing through the heater wire 122 encounters resistance, which is the opposition to the passage of the electric current therethrough, thus resulting in the heating of the heater wire 122.

The resistance of a given object depends primarily on the material and the shape of the object. For a given material, the resistance is inversely proportional to the cross-sectional area. For instance, a thick wire of a particular metal will have a lower resistance than a thin wire of that same metal. Additionally, for a given material, the resistance is proportional to the length. Consequently, a short wire of a particular metal will have a lower resistance than a long wire of that same metal.

The resistance R of a conductor of uniform cross section can be expressed as $$R = \rho\frac{L}{A},$$

where p is the resistivity (Ω·m), L is the length of the conductor (m), and A is the cross-sectional area of the conductor ($m^2$). The above equation may also be rearranged and expressed in terms of resistivity p, wherein $$\rho = \frac{RA}{L}.$$

Resistivity p is a measure of a given material's ability to oppose the flow of electric current and varies with temperature. Resistivity p is an intrinsic property, unlike resistance R. In particular, the wires of a given material (irrespective of their shape and size) will have approximately the same resistivity, but a long, thin wire of the given material will have a much larger resistance than a thick, short wire of that same material. Every material has its own characteristic resistivity. Thus, the resistivity of a wire at a given temperature depends only on the material used to form the wire and not on the geometry of the wire.

The heater wire 122 in FIG. 1 may have a resistivity of about 0.5 to 1.5 μΩ·m (e.g., about 0.8 to 1.2 μΩ·m or about 1 μΩ·m). Additionally, the heater wire 122 may have a resistance of about 1 to 10Ω (e.g., about 3 to 8Ω). Various suitable metals and alloys may be used to form the heater wire 122 so as to fall within the above resistivity/resistance parameters. For instance, the heater wire 122 may be formed of a nickel-chromium alloy, although example embodiments are not limited thereto.

The base wire 120 is insulated from the heater wire 122. As a result, the loss of the supplied current and the dissipation of the generated heat from the heater wire 122 to the base wire 120 can be reduced or prevented. To achieve the pertinent insulation from the heater wire 122, the base wire 120 may be an anodized wire. In an example embodiment, the anodized wire is an object wire 124 coated with an anodic layer 126 (e.g., oxide layer). The object wire 124 may be an aluminum wire, a titanium wire, a zinc wire, a magnesium wire, a niobium wire, a zirconium wire, a hafnium wire, or a tantalum wire. However, it should be understood that the object wire 124 may be formed of other suitable metals that are capable of being anodized to grow the anodic layer 126 thereon. The anodic layer 126 has a thickness of at least 500 nm (e.g., at least 1000 nm). Additionally, the anodic layer 126 may have a thickness of up to 10,000 nm. In furtherance of the reduction or prevention of the above-mentioned loss of the supplied current and the dissipation of the generated heat from the heater wire 122 to the base wire 120, the anodic layer 126 may be grown so as to have a dielectric strength of at least 150 V/m.

Alternatively, to achieve the pertinent insulation from the heater wire 122, the base wire 120 may be a transition metal-based wire (e.g., 124) coated with vitreous enamel (e.g., 126). The transition metal-based wire may be a nickel wire, a nickel-chromium wire, or a stainless steel wire, although example embodiments are not limited thereto.

It should be understood that the heater structure 114 may be implemented in a variety of shapes, sizes, and forms. For instance, in an e-vapor device, the heater structure 114 may be ring-shaped or C-shaped to allow the use of a wick that is in elongated form (e.g., cord). In such an example, the wick would extend through the ring-shaped or C-shaped heater structure while also arranged in fluidic communication with the reservoir. Additionally, the wick may be thicker than those in the related art, thereby reducing or preventing the likelihood of clogging. Furthermore, the stronger and more robust nature of the heater structure 114 allows this structure to squeeze the wick to a greater degree than possible with other related heaters in the art. In a non-limiting embodiment, the heater structure 114 may be in a shape of a toroidal inductor, wherein the base wire 120 is in a form of a ring around which the heater wire 122 is coiled.

Alternatively, the heater structure 114 may be arranged so as to apply a spring force against the dispensing interface of the pre-vapor sector. The dispensing interface may include a wick that is in planar form (e.g., pad with mesh-like weave) and in fluidic communication with the reservoir. In such an example, the heater structure 114 would press against the dispensing interface. For instance, the heater structure 114 may have a yield strength of about 50 to 600 MPa to allow the desired amount of pressure to be applied to the dispensing interface. Furthermore, to increase the contact area with the dispensing interface, the heater structure 114 may be provided with a winding pattern.

A method of generating a vapor for an e-vapor device may include thermally contacting a pre-vapor sector within the e-vapor device with a heater structure. The pre-vapor sector includes a reservoir and a dispensing interface. The dispensing interface may be in a form of an absorbent material that is arranged in fluidic communication with the heater structure. In particular, the pre-vapor formulation within the pre-vapor sector may directly contact the heater structure. The heater structure includes a base wire and a heater wire coiled around the base wire. The base wire is insulated from the heater wire. In an example embodiment, the base wire is electrically insulated (but not thermally insulated) from the heater wire.

Figure 2:
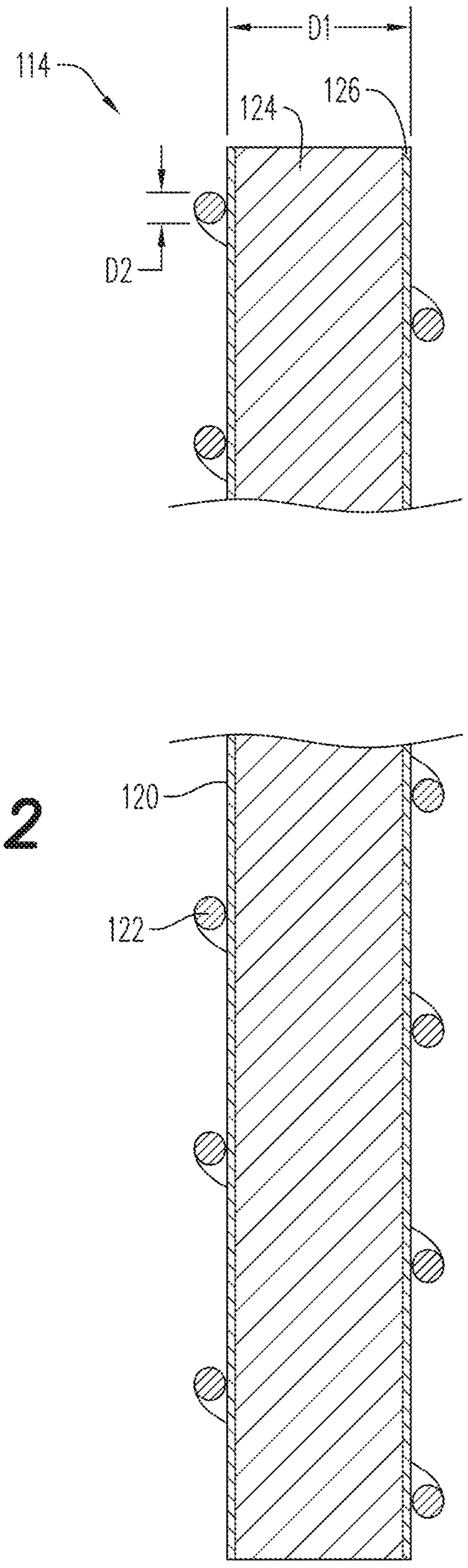
FIG. 2 is a cross-sectional view of the heater structure of FIG. 1.

FIG. 2 is a cross-sectional view of the heater structure of FIG. 1. Referring to FIG. 2, the object wire 124 is electrically isolated from the heater wire 122 by the anodic layer 126. As a result, even when the object wire 124 and the heater wire 122 are conductors, the loss of current from the heater wire 122 to the object wire 124 can be mitigated or precluded by the anodic layer 126. Additionally, although the heater structure 114 in FIGS. 1-2 appears as a stout, cylindrical structure (by virtue of the partial view thereof), it should be understood that the heater structure 114 can be relatively long and the underlying base wire 120 can be deformed to provide various foundational shapes and forms for the heater wire 122 to coil around. Furthermore, the spacing between the coils of the heater wire 122 will depend at least on the first diameter D1 of the base wire 120 and the length of the heater wire 122. For instance, the spacing between the coils of the heater wire 122 will be smaller when the first diameter D1 of the base wire 120 is smaller and/or the length of the heater wire 122 is longer. Conversely, the spacing between the coils of the heater wire 122 will be larger when the first diameter D1 of the base wire 120 is larger and/or the length of the heater wire 122 is shorter.

Figure 3:
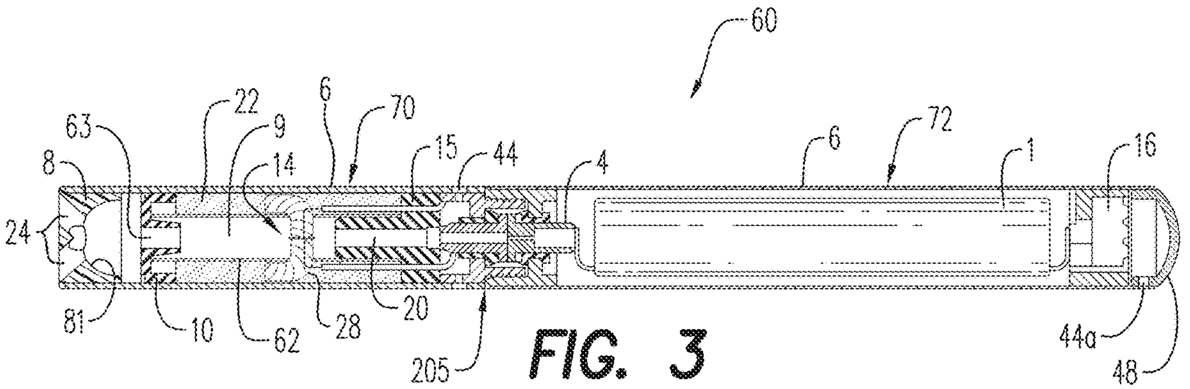
FIG. 3 is a cross-sectional view of an e-vapor device including a heater structure according to an example embodiment.

FIG. 3 is a cross-sectional view of an e-vapor device including a heater structure according to an example embodiment. Referring to FIG. 3, an e-vapor device 60 includes a first section 70 coupled to a second section 72 via a threaded connection 205. The first section 70 may be a replaceable cartridge, and the second section 72 may be a reusable fixture, although example embodiments are not limited thereto. The threaded connection 205 may be a combination of a male threaded member on the first section 70 and a female threaded receiver on the second section 72 (or vice versa). Alternatively, the threaded connection 205 may be in a form of other suitable structures, such as a snug-fit, detent, clamp, and/or clasp arrangement. The first section 70 includes an outer tube 6 (or housing) extending in a longitudinal direction and an inner tube 62 within the outer tube 6. The inner tube 62 may be coaxially positioned within the outer tube 6. The second section 72 may also include the outer tube 6 (or housing) extending in a longitudinal direction. In an alternative embodiment, the outer tube 6 can be a single tube housing both the first section 70 and the second section 72, and the entire e-vapor device 60 can be disposable.

The e-vapor device 60 includes a central air passage 20 defined in part by the inner tube 62 and an upstream seal 15. Additionally, the e-vapor device 60 includes a reservoir 22. The reservoir 22 is configured to hold a pre-vapor formulation and optionally a storage medium operable to store the pre-vapor formulation therein. In an example embodiment, the reservoir 22 is contained in an outer annulus between the outer tube 6 and the inner tube 62. The outer annulus is sealed by the seal 15 at an upstream end and by a stopper 10 at a downstream end so as to prevent leakage of the pre-vapor formulation from the reservoir 22.

A heater structure 14 is contained in the inner tube 62 downstream of and in a spaced apart relation to the portion of central air passage 20 defined by the seal 15. The heater structure 14 may be as described in connection with the heater structure 114 in FIGS. 1-2 and can be in the form of a ring, although example embodiments are not limited thereto. A wick 28 is in communication with the pre-vapor formulation in the reservoir 22 and in communication with the heater structure 14 such that the wick 28 dispenses the pre-vapor formulation in proximate relation to the heater structure 14. Thus, the wick 28 may be regarded as a dispensing interface for the pre-vapor formulation. The combination of at least the reservoir 22 and the dispensing interface (e.g., wick 28) may be regarded as the pre-vapor sector.

The wick 28 is absorbent and may be constructed of a fibrous and flexible material. In particular, the wick 28 may include at least one filament having a capacity to draw a pre-vapor formulation into the wick 28. For example, the wick 28 may include a bundle of filaments, such as glass (or ceramic) filaments. In another instance, the wick 28 may include a bundle comprising a group of windings of glass filaments (e.g., three of such windings), all which arrangements are capable of drawing a pre-vapor formulation into the wick 28 via capillary action as a result of the interstitial spacing between the filaments. A power supply 1 in the second section 72 is operably connected to the heater structure 14 to apply a voltage across the heater structure 14. The e-vapor device 60 also includes at least one air inlet 44 operable to deliver air to the central air passage 20 and/or other portions of the inner tube 62.

The e-vapor device 60 further includes a mouth-end insert 8 having at least two off-axis, diverging outlets 24. The mouth-end insert 8 is in fluidic communication with the central air passage 20 via the interior of inner tube 62 and a central passage 63, which extends through the stopper 10. The heater structure 14 is configured to heat the pre-vapor formulation to a temperature sufficient to vaporize the pre-vapor formulation and form a vapor. Other orientations of the heater structure 14 (other than that shown in the drawings) are contemplated. For instance, although the heater structure 14 is shown as being arranged centrally within the inner tube 62, it should be understood that the heater structure 14 can also be arranged adjacent to an inner surface of the inner tube 62.

The wick 28, reservoir 22, and mouth-end insert 8 are contained in the first section 70, and the power supply 1 is contained in the second section 72. In an example embodiment, the first section (e.g., cartridge) 70 is disposable, and the second section (e.g., fixture) 72 is reusable. The first section 70 and second section 72 can be attached by a threaded connection 205, whereby the first section 70 can be replaced when the pre-vapor formulation in the reservoir 22 is depleted. Having a separate first section 70 and second section 72 provides a number of advantages. First, if the first section 70 contains the heater structure 14, the reservoir 22, and the wick 28, all elements which are potentially in contact with the pre-vapor formulation are disposed of when the first section 70 is replaced. Thus, there will be no cross-contamination between different mouth-end inserts 8 (e.g., when using different pre-vapor formulations). Also, if the first section 70 is replaced at suitable intervals, there is less chance of the heater structure 14 becoming clogged with the pre-vapor formulation. Optionally, the first section 70 and the second section 72 may be arranged to releasably lock together when engaged.

Although not shown, the outer tube 6 can include a clear (transparent) window formed of a transparent material so as to allow an adult vaper to see the amount of pre-vapor formulation remaining in the reservoir 22. The clear window can extend at least a portion of the length of the first section 70 and can extend fully or partially about the circumference of the first section 70. In another example embodiment, the outer tube 6 can be at least partially formed of a transparent material so as to allow an adult vaper to see the amount of pre-vapor formulation remaining in the reservoir 22.

The at least one air inlet 44 may include one, two, three, four, five, or more air inlets. If there is more than one air inlet, the air inlets may be located at different locations along the e-vapor device 60. For example, an air inlet 44*a* can be positioned at the upstream end of the e-vapor device 60 adjacent a puff sensor 16 such that the puff sensor 16 facilitates the supply of power to the heater structure 14 upon sensing the application of a negative pressure by the adult vaper. The air inlet 44*a* is in communication with the mouth-end insert 8 such that a draw upon the mouth-end insert 8 will activate the puff sensor 16. During a draw by an adult vaper, the air from the air inlet 44*a* will flow along the power supply 1 (e.g., battery) to the central air passage 20 in the seal 15 and/or to other portions of the inner tube 62 and/or outer tube 6. The at least one air inlet can be located adjacent to and upstream of the seal 15 or at any other desirable location. Altering the size and number of air inlets can also aid in establishing the desired resistance to draw (RTD) of the e-vapor device 60.

The heater structure 14 is arranged to communicate with the wick 28 and to heat the pre-vapor formulation contained in the wick 28 to a temperature sufficient to vaporize the pre-vapor formulation and form a vapor. The heater structure 14 may be a ring-type arrangement surrounding the wick 28. Examples of suitable electrically resistive materials for the heater structure 14 include titanium, zirconium, tantalum, and metals from the platinum group. Examples of suitable metal alloys include stainless steel, nickel-, cobalt-, chromium-, aluminum-, titanium-, zirconium-, hafnium-, niobium-, molybdenum-, tantalum-, tungsten-, tin-, gallium-, manganese-, and iron-containing alloys, and super-alloys based on nickel, iron, cobalt, and stainless steel. For instance, the heater structure 14 may include nickel aluminides, a material with a layer of alumina on the surface, iron aluminides, and other composite materials. The electrically resistive material may optionally be embedded in, encapsulated, or coated with an insulating material or vice-versa, depending on the kinetics of energy transfer and the external physicochemical properties required. In a non-limiting embodiment, the heater structure 14 comprises at least one material selected from the group consisting of stainless steel, copper, copper alloys, nickel-chromium alloys, superalloys, and combinations thereof. In another non-limiting embodiment, the heater structure 14 includes nickel-chromium alloys or iron-chromium alloys. Furthermore, the heater structure 14 can include a ceramic portion having an electrically resistive layer on an outside surface thereof. A higher resistivity for the heater structure 14 lowers the current draw or load on the power supply (battery) 1.

The heater structure 14 may heat the pre-vapor formulation in the wick 28 by thermal conduction. Alternatively, the heat from the heater structure 14 may be conducted to the pre-vapor formulation by means of a heat conductive element or the heater structure 14 may transfer the heat to the incoming ambient air that is drawn through the e-vapor device 60 during vaping, which in turn heats the pre-vapor formulation by convection.

The wick 28 extends through opposing openings in the inner tube 62 such that the end portions 31 of the wick 28 are in contact with the pre-vapor formulation in the reservoir 22. The filaments of the wick 28 may be generally aligned in a direction transverse to the longitudinal direction of the e-vapor device 60, although example embodiments are not limited thereto. During the operation of the e-vapor device 60, the wick 28 draws the pre-vapor formulation from the reservoir 22 to the heater structure 14 via capillary action as a result of the interstitial spacing between the filaments of the wick 28. The wick 28 can include filaments having a cross-section which is generally cross-shaped, clover-shaped, Y-shaped, or in any other suitable shape. The capillary properties of the wick 28, combined with the properties of the pre-vapor formulation, can be tailored to ensure that the wick 28 will be wet in the area of the heater structure 14 to avoid overheating. The wick 28 and the optional fibrous storage medium (of the reservoir 22) may be constructed from an alumina ceramic. Alternatively, the wick 28 may include glass fibers, and the optional fibrous storage medium may include a cellulosic material or polyethylene terephthalate.

The power supply 1 may include a battery arranged in the e-vapor device 60 such that the anode is downstream from the cathode. A battery anode connector 4 contacts the downstream end of the battery. The heater structure 14 is connected to the battery by two spaced apart electrical leads. The connection between the end portions 27 and 27' of the heater structure 14 and the electrical leads are highly conductive and temperature resistant, while the heater structure 14 is highly resistive so that heat generation occurs primarily along the heater structure 14 and not at the contacts.

The battery may be a Lithium-ion battery or one of its variants (e.g., a Lithium-ion polymer battery). The battery may also be a Nickel-metal hydride battery, a Nickel cadmium battery, a Lithium-manganese battery, a Lithium-cobalt battery, or a fuel cell. The e-vapor device 60 is usable until the energy in the power supply 1 is depleted, after which the power supply 1 will need to be replaced. Alternatively, the power supply 1 may be rechargeable and include circuitry allowing the battery to be chargeable by an external charging device. In this rechargeable embodiment, the circuitry, when charged, provides power for a desired or pre-determined number of applications of negative pressure, after which the circuitry must be re-connected to an external charging device.

The e-vapor device 60 also includes control circuitry including the puff sensor 16. The puff sensor 16 is operable to sense an air pressure drop and to initiate the application of voltage from the power supply 1 to the heater structure 14. The control circuitry includes a heater activation light 48 operable to glow when the heater structure 14 is activated. The heater activation light 48 may include an LED and may be arranged at an upstream end of the e-vapor device 60 so that the heater activation light 48 takes on the appearance of a burning coal during the application of negative pressure. Alternatively, the heater activation light 48 can be arranged on the side of the e-vapor device 60 so as to be more visible to the adult vaper and/or to provide a desired aesthetic appeal. The heater activation light 48 may have various shapes, sizes, quantities, and configurations. For instance, the heater activation light 48 may have a circular, elliptical, or polygonal shape (for one or more such lights). In another instance, the heater activation light 48 may have a linear or annular form that is continuous or segmented. For example, the heater activation light may be provided as an elongated strip that extends along the body of the e-vapor device 60. In another example, the heater activation light 48 may be provided as a ring that extends around the body of the e-vapor device 60. The ring may be in the first section 70 or the second section 72 (e.g., adjacent to the upstream end). It should be understood that the heater activation light 48 can be arranged on the end(s) and/or the sides of the e-vapor device 60. Furthermore, the heater activation light 48 can be utilized for e-vapor system diagnostics. The heater activation light 48 can also be configured such that the adult vaper can activate and/or deactivate the heater activation light 48 for privacy, such that, if desired, the heater activation light 48 would not activate during vaping.

The control circuitry integrated with the puff sensor 16 may automatically supply power to the heater structure 14 in response to the puff sensor 16, for example, with a maximum, time-period limiter. Alternatively, the control circuitry may include a manually operable switch for an adult vaper to initiate vaping. The time-period of the electric current supply to the heater structure 14 may be pre-set depending on the amount of pre-vapor formulation desired to be vaporized. The control circuitry may be programmable for this purpose. The control circuitry may supply power to the heater structure 14 as long as the puff sensor 16 detects a pressure drop.

When activated, the heater structure 14 heats a portion of the wick 28 surrounded by the heater structure 14 for less than about 10 seconds (e.g., less than about 7 seconds). Thus, the power cycle (or maximum length for the continuous application of negative pressure) can range from about 2 seconds to about 10 seconds (e.g., about 3 seconds to about 9 seconds, about 4 seconds to about 8 seconds, or about 5 seconds to about 7 seconds).

The reservoir 22 may at least partially surround the central air passage 20, and the heater structure 14 and the wick 28 may extend between portions of the reservoir 22. The optional storage medium within the reservoir 22 may be a fibrous material including cotton, polyethylene, polyester, rayon, and combinations thereof. The fibers may have a diameter ranging in size from about 6 microns to about 15 microns (e.g., about 8 microns to about 12 microns or about 9 microns to about 11 microns). Also, the fibers may be sized to be irrespirable and can have a cross-section with a Y shape, cross shape, clover shape, or any other suitable shape. Instead of fibers, the optional storage medium may be a sintered, porous, or foamed material. Furthermore, it should be understood that the reservoir 22 may just be a filled tank lacking a fibrous storage medium.

The pre-vapor formulation has a boiling point suitable for use in the e-vapor device 60. If the boiling point is too high, the heater structure 14 may not be able to adequately vaporize the pre-vapor formulation in the wick 28. Conversely, if the boiling point is too low, the pre-vapor formulation may prematurely vaporize without the heater structure 14 even being activated.

The pre-vapor formulation may be a tobacco-containing material including volatile tobacco flavor compounds which are released from the pre-vapor formulation upon heating. The pre-vapor formulation may also be a tobacco flavor containing material or a nicotine-containing material. Alternatively, or in addition thereto, the pre-vapor formulation may include a non-tobacco material. For instance, the pre-vapor formulation may include water, solvents, active ingredients, ethanol, plant extracts, and natural or artificial flavors. The pre-vapor formulation may further include a vapor former. Examples of suitable vapor formers are glycerine, propylene glycol, etc.

During vaping, the pre-vapor formulation is transferred from the reservoir 22 to the proximity of the heater structure 14 by capillary action via the wick 28. The wick 28 has a first end portion and an opposite second end portion 31. The first end portion and the second end portion 31 extend into opposite sides of the reservoir 22 to contact the pre-vapor formulation contained therein. The heater structure 14 surrounds at least a portion of the wick 28 such that when the heater structure 14 is activated, the pre-vapor formulation in that portion (e.g., central portion) of the wick 28 is vaporized by the heater structure 14 to form a vapor.

The reservoir 22 may be configured to protect the pre-vapor formulation therein from oxygen so that the risk of degradation of the pre-vapor formulation is significantly reduced. Additionally, the outer tube 6 may be configured to protect the pre-vapor formulation from light so that the risk of degradation of the pre-vapor formulation is significantly reduced.

The mouth-end insert 8 include at least two diverging outlets 24 (e.g., 3, 4, 5, or more). The outlets 24 of the mouth-end insert 8 are located at the ends of off-axis passages and are angled outwardly in relation to the longitudinal direction of the e-vapor device 60. As used herein, the term "off-axis" denotes at an angle to the longitudinal direction of the e-vapor device. Also, the mouth-end insert (or flow guide) 8 may include outlets uniformly distributed around the mouth-end insert 8 so as to substantially uniformly distribute the vapor in an adult vaper's mouth during vaping. Thus, as the vapor passes into an adult vaper's mouth, the vapor moves in different directions so as to provide a full mouth feel as compared to e-vapor devices having an on-axis single orifice which directs the vapor to a single location in an adult vaper's mouth.

The outlets 24 and off-axis passages are arranged such that droplets of unvaporized pre-vapor formulation (carried in the vapor impact interior surfaces 81 at the mouth-end insert 8 and/or interior surfaces of the off-axis passages) are removed or broken apart. The outlets 24 of the mouth-end insert 8 are located at the ends of the off-axis passages and may be angled at 5 to 60 degrees with respect to the central axis of the outer tube 6 so as to remove droplets of unvaporized pre-vapor formulation and to more completely distribute the vapor throughout a mouth of an adult vaper during vaping. Each outlet 24 may have a diameter of about 0.015 inch to about 0.090 inch (e.g., about 0.020 inch to about 0.040 inch or about 0.028 inch to about 0.038 inch). The size of the outlets 24 and off-axis passages along with the number of outlets 24 can be selected to adjust, if desired, the resistance to draw (RTD) of the e-vapor device 60.

An interior surface 81 of the mouth-end insert 8 may be a generally domed surface. Alternatively, the interior surface 81 of the mouth-end insert 8 may be generally cylindrical or frustoconical with a planar end surface. The interior surface 81 may be substantially uniform over the surface thereof or symmetrical about the longitudinal axis of the mouth-end insert 8. However, the interior surface 81 can alternatively be irregular and/or have other shapes.

The mouth-end insert 8 may be integrally affixed within the outer tube 6 of the first section 70. The mouth-end insert 8 may be formed of a polymer selected from the group consisting of low density polyethylene, high density polyethylene, polypropylene, polyvinylchloride, polyetheretherketone (PEEK), and combinations thereof. The mouth-end insert 8 may also be colored if desired.

The e-vapor device 60 may also include an air flow diverter. The air flow diverter is operable to manage the air flow at or around the heater structure 14 so as to abate a tendency for drawn air to cool the heater structure 14, which could otherwise lead to diminished vapor output. In an example embodiment, an air flow diverter may include an impervious plug at a downstream end of the central air passage 20 in seal 15. The central air passage 20 is an axially extending central passage in seal 15 and inner tube 62. The seal 15 seals the upstream end of the annulus between the outer tube 6 and the inner tube 62. The air flow diverter may include at least one radial air channel to direct the air from the central air passage 20 outward towards the inner tube 62 and into an outer air passage 9 defined between an outer periphery of a downstream end portion of the seal 15 and the inner wall of inner tube 62.

The diameter of the bore of the central air passage 20 may be substantially the same as the diameter of the at least one radial air channel. The diameter of the bore of the central air passage 20 and the at least one radial air channel may range from about 1.5 mm to about 3.5 mm (e.g., about 2.0 mm to about 3.0 mm). Optionally, the diameter of the bore of the central air passage 20 and the at least one radial air channel can be adjusted to control the resistance to draw (RTD) of the e-vapor device 60. During vaping, the air flows into the bore of the central air passage 20, through the at least one radial air channel, and into the outer air passage 9 such that a lesser portion of the air flow is directed at a central portion of the heater structure 14 so as to reduce or minimize the cooling effect of the airflow on the heater structure 14 during the heating cycles. Thus, the incoming air is directed away from the center of the heater structure 14 and the air velocity past the heater structure 14 is reduced as compared to when the air flows through a central opening in the seal 15 oriented directly in line with a middle portion of the heater structure 14.

Figure 4:
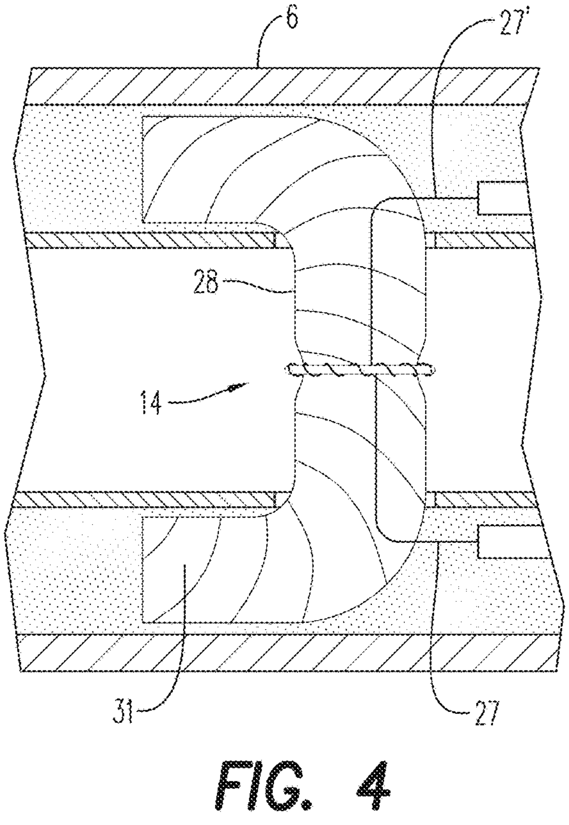
FIG. 4 is an enlarged view of the portion of the e-vapor device including the heater structure of FIG. 3.

FIG. 4 is an enlarged view of the portion of the e-vapor device including the heater structure of FIG. 3. Referring to FIGS. 3-4, the heater structure 14 is a ring-type arrangement with the wick 28 extending therethrough. The principle of heater structure 14 in FIGS. 3-4 may be as described in connection with the heater structure 114 in FIGS. 1-2. In particular, the base wire and heater wire of the heater structure 14 in FIGS. 3-4 correspond to the base wire 120 and heater wire 122 of the heater structure 114 in FIGS. 1-2, respectively. Notably, the base wire 120 in FIGS. 1-2 is configured as a ring in FIGS. 3-4. Additionally, the heater wire 122 in FIGS. 1-2 is coiled around the ring in FIGS. 3-4. Furthermore, as shown in FIGS. 3-4, one end of the heater wire extends upward to connect to a positive (or negative) terminal of the power supply 1 via an electrical lead, while the opposing end of the heater wire extends downward to connect to a negative (or positive) terminal of the power supply 1 via another electrical lead.

As shown in FIGS. 3-4, the wick 28 extends through the opening of the ring-type arrangement of the heater structure 14. The end portions 31 of the wick 28 also extend through the inner tube 62 so as to be in fluidic communication with the pre-vapor formulation in the reservoir 22. As a result, when a current is supplied to the heater structure 14 from the power supply 1, the heater wires will undergo resistive heating and vaporize the pre-vapor formulation in the wick 28 to produce a vapor that is drawn through an outlet of the device when a negative pressure is applied.

Figure 5:
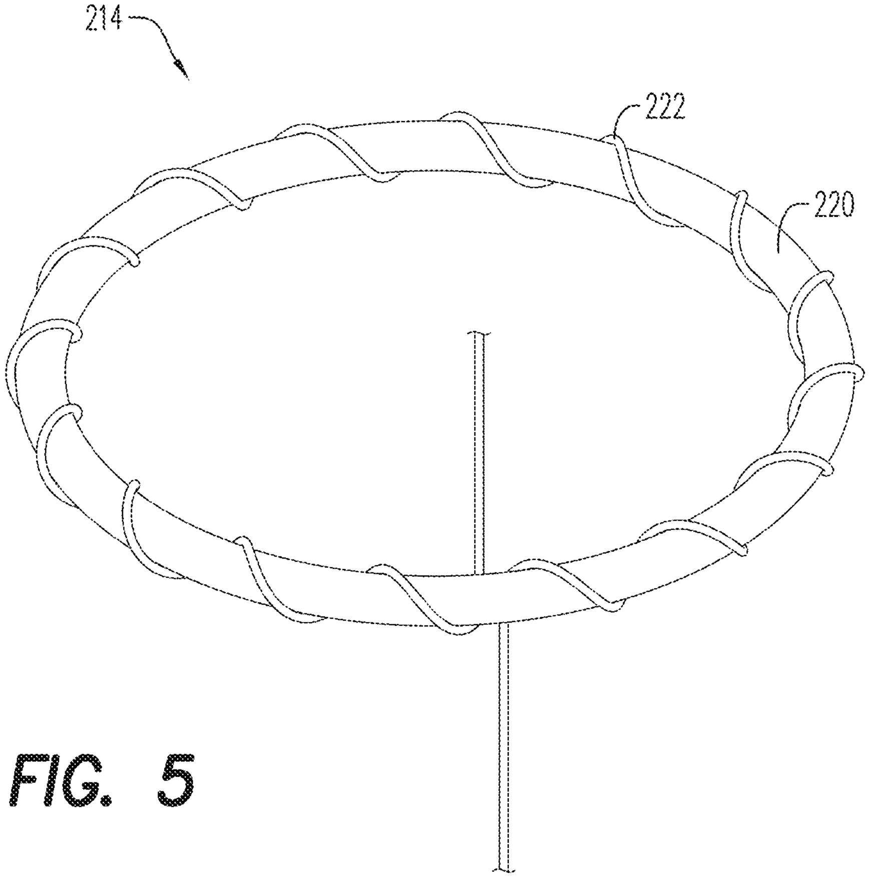
FIG. 5 is a perspective view of a heater structure having an annular shape according to an example embodiment.

FIG. 5 is a perspective view of a heater structure having an annular shape according to an example embodiment. Referring to FIG. 5, the heater structure 214 may correspond to the heater structure 14 in FIGS. 3-4. Additionally, the base wire 220 and the heater wire 222 of FIG. 5 may correspond to the base wire 120 and the heater wire 122 of FIG. 1. The opening defined by the base wire 220 is intended to receive a wick having an elongated form. Although not shown in FIG. 5, the ends of the heater wire 222 will be connected to a power supply via electrical leads. Additionally, it should be understood that the ends of the heater wire 222 may be oriented in various directions based on the location of the electrical leads (e.g., both up, both down). In addition to generating heat, the heater wire 222 supports and positions the base wire 220 at a desired location within the e-vapor device. Furthermore, the base wire 220 may be ring-shaped or oval-shaped based on a top or bottom view. When the base wire 220 is ring-shaped, the inner diameter may be equal to or less than a diameter of the wick intended to extend therethrough.

Figure 6:
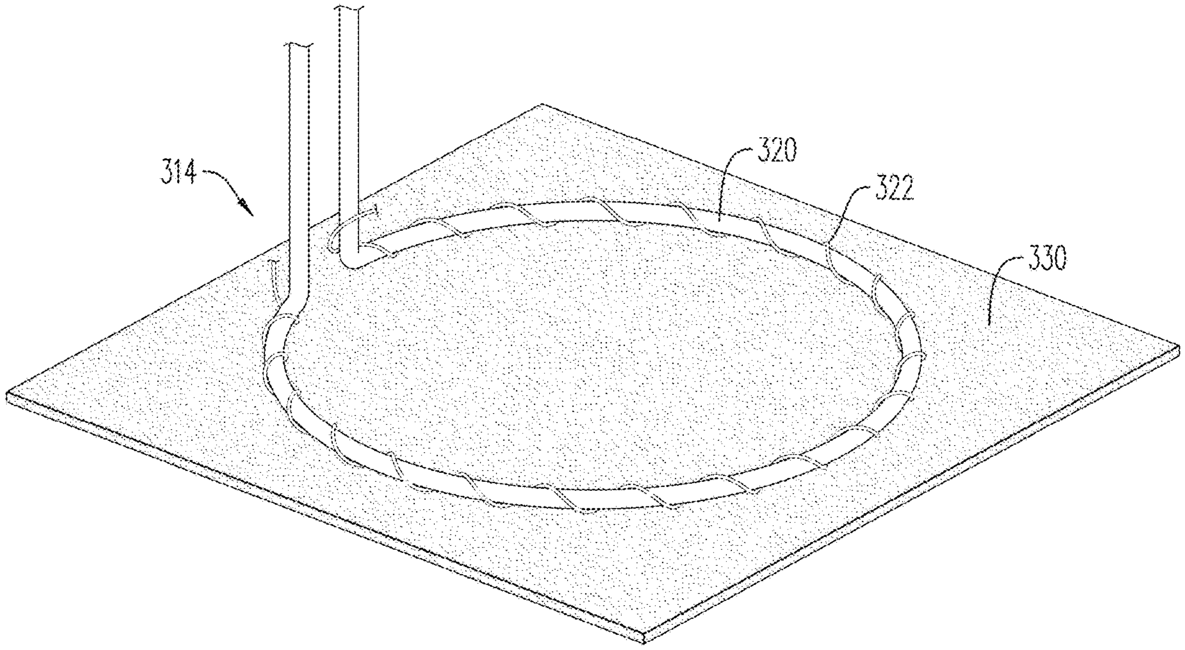
FIG. 6 is a perspective view of a heater structure having a loop shape according to an example embodiment.

FIG. 6 is a perspective view of a heater structure having a loop shape according to an example embodiment. Referring to FIG. 6, the heater structure 314 is configured to be pressed against a dispensing interface 330 of a pre-vapor sector of an e-vapor device. The base wire 320 and the heater wire 322 of FIG. 6 may correspond to the base wire 120 and the heater wire 122 of FIG. 1. Although the base wire 320 is shown as being formed into a loop shape around which the heater wire 322 is coiled, it will be appreciated that the base wire 320 may be manipulated to continue to circle within itself to form a spiral shape, which will provide a greater contact area with the dispensing interface 330. In another example, the base wire 320 may be manipulated into a different curvilinear shape (e.g., flower shape) or a polygonal shape (e.g., star shape). The dispensing interface 330 may be a wick having a planar form. In an e-vapor device, the dispensing interface 330 may be disposed in or around an opening (e.g., in inner tube 62) leading into the reservoir. The shape of the dispensing interface 330 and the heater structure 314 making contact therewith may correspond to the shape of the opening (e.g., in inner tube 62) leading into the reservoir. Thus, if the opening has a circular shape, then the dispensing interface 330 and the heater structure 314 may also have a circular shape. The vertical portions of the base wire 320 may function as a handle and/or as a mechanism for applying a spring force against the dispensing interface 330. For example, to apply a spring force against the dispensing interface 330, the vertical portions of the heater structure 314 may be curved or bent to allow the resilience of the base wire 320 press the heater wire 322 into the dispensing interface 330. Furthermore, although not shown in FIG. 6, the ends of the heater wire 322 will be connected to a power supply via electrical leads. During vaping, the heater structure 314 will vaporize the pre-vapor formulation in the dispensing interface 330 to form a vapor that is drawn through an outlet of the device when a negative pressure is applied.

Figure 7:
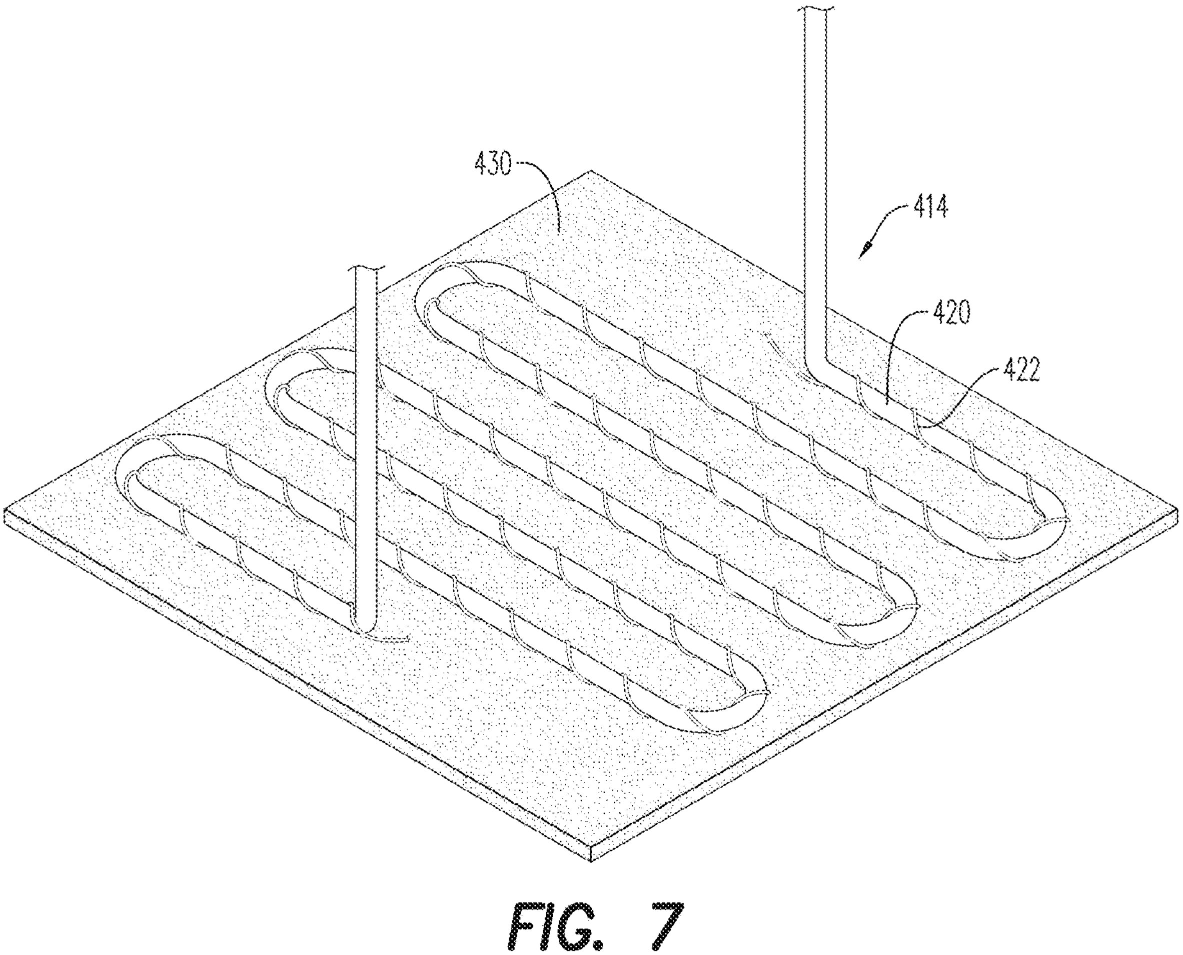
FIG. 7 is a perspective view of a heater structure having a winding form that resembles a polygonal shape according to an example embodiment.

FIG. 7 is a perspective view of a heater structure having a winding form that resembles a polygonal shape according to an example embodiment. Referring to FIG. 7, the heater structure 414 is configured to be pressed against a dispensing interface 430 of a pre-vapor sector of an e-vapor device. The base wire 420 and the heater wire 422 of FIG. 7 may correspond to the base wire 120 and the heater wire 122 of FIG. 1. As shown in FIG. 7, the heater structure 414 has a winding form that resembles a polygonal shape (e.g., square, rectangle). The dispensing interface 430 may be a wick having a planar form. In an e-vapor device, the dispensing interface 430 may be disposed in or around an opening (e.g., in inner tube 62) leading into the reservoir. The vertical portions of the base wire 420 may function as a handle and/or as a mechanism for applying a spring force against the dispensing interface 430. Furthermore, although not shown in FIG. 7, the ends of the heater wire 422 will be connected to a power supply via electrical leads. During vaping, the heater structure 414 will vaporize the pre-vapor formulation in the dispensing interface 430 to form a vapor that is drawn through an outlet of the device when a negative pressure is applied.

Figure 8:
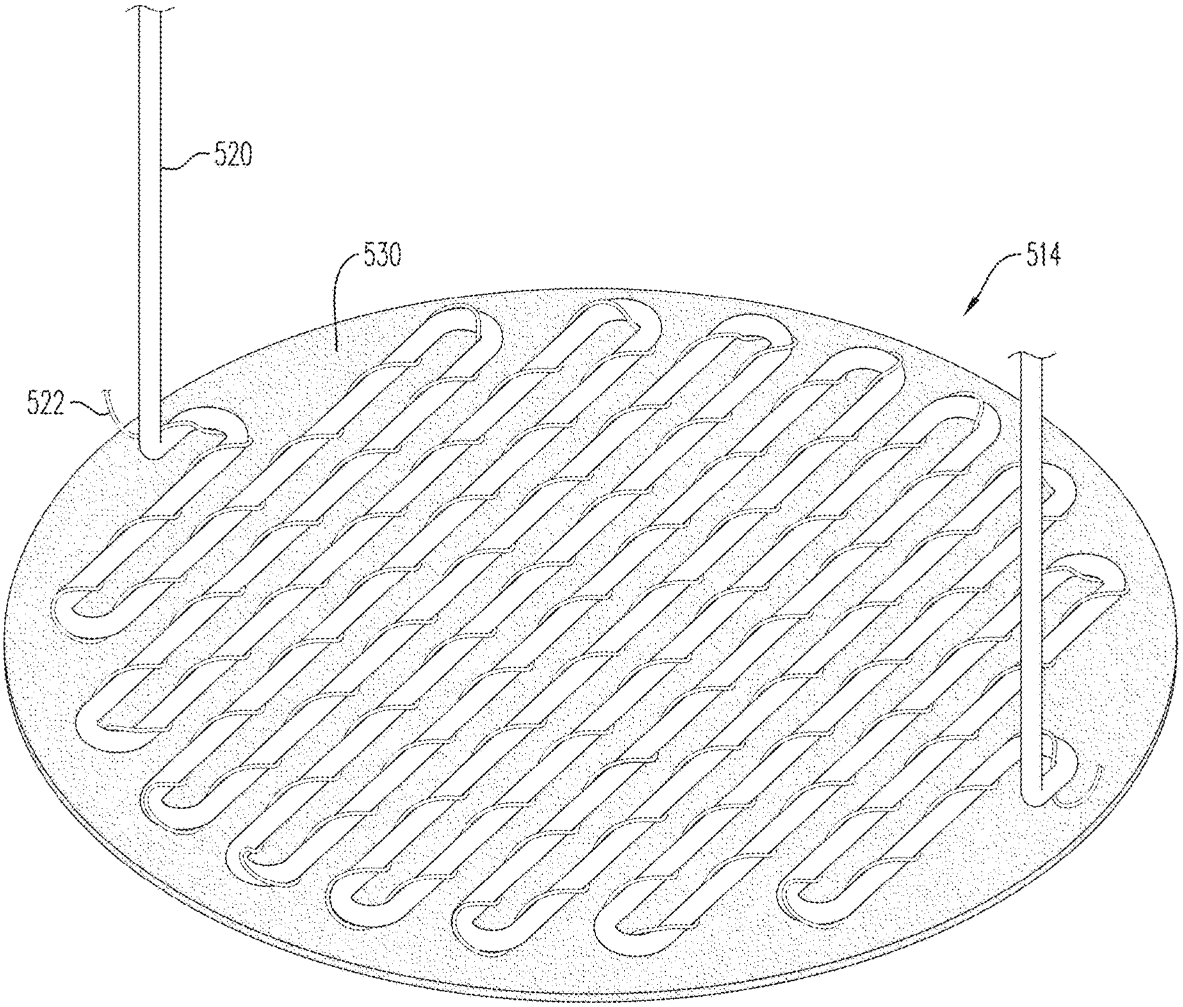
FIG. 8 is a perspective view of a heater structure having a winding form that resembles a circular shape according to an example embodiment.

FIG. 8 is a perspective view of a heater structure having a winding form that resembles a circular shape according to an example embodiment. Referring to FIG. 8, the heater structure 514 is configured to be pressed against a dispensing interface 530 of a pre-vapor sector of an e-vapor device. The base wire 520 and the heater wire 522 of FIG. 8 may correspond to the base wire 120 and the heater wire 122 of FIG. 1. As shown in FIG. 8, the heater structure 514 has a winding form that resembles a circular shape. The dispensing interface 530 may be a wick having a planar form. In an e-vapor device, the dispensing interface 530 may be disposed in or around an opening (e.g., in inner tube 62) leading into the reservoir. The vertical portions of the base wire 520 may function as a handle and/or as a mechanism for applying a spring force against the dispensing interface 530. Furthermore, although not shown in FIG. 8, the ends of the heater wire 522 will be connected to a power supply via electrical leads. During vaping, the heater structure 514 will vaporize the pre-vapor formulation in the dispensing interface 530 to form a vapor that is drawn through an outlet of the device when a negative pressure is applied.

In addition to the examples discussed herein, the heater structure may have a helical form that resembles a cylindrical shape (or even a conical shape). For instance, the base wire serves as a framework for the heater structure and may be a cylindrical helix with the heater wire coiled around the base wire. The heater structure may be arranged within an inner tube (e.g., inner tube 62) of an e-vapor device such that the free length of the helical form extends coaxially with the inner tube along a portion or an entirety thereof. Additionally, a dispensing interface (e.g., absorbent layer) may be disposed between the heater structure and the inner tube. One or more absorbent layers (e.g., gauze) serving as the dispensing interface may wrapped around the heater structure. In this non-limiting embodiment, the absorbent layer serving as the dispensing interface may be pressed against the interior surface of the inner tube via the resiliency of the heater structure. In this regard, the outer diameter of the helical form of the heater structure may correspond approximately to the inner diameter of the inner tube (or otherwise be appropriately sized to take into account the thickness of the dispensing interface) so as to exert a spring force that causes the absorbent layer serving as the dispensing interface to be pressed against the interior surface of the inner tube. Furthermore, the inner tube may also have one or more holes that allow pre-vapor formulation from the reservoir (e.g., reservoir 22) to be drawn into the dispensing interface via capillary action. As a result, when the e-vapor device is activated, the heater structure will vaporize the pre-vapor formulation in the dispensing interface to form a vapor that is drawn through an outlet of the device when a negative pressure is applied. In the configuration, the reservoir may optionally be in a form of a filled tank that does not include a storage medium (e.g., fibrous material).

While a number of example embodiments have been disclosed herein, it should be understood that other variations may be possible. Such variations are not to be regarded as a departure from the spirit and scope of the present disclosure, and all such modifications that would be appreciated by one ordinarily skilled in the art based on the teachings herein are intended to be included within the scope of the following claims.

The invention claimed is:

1. A cartridge for an e-vapor device, comprising:
- an outer housing;
- an inner tube within the outer housing and defining a central air passage;
- a reservoir between the outer housing and the inner tube, the reservoir including a pre-vapor formulation;
- a dispensing interface adjacent an opening in the inner tube and in fluidic communication with the reservoir, the dispensing interface being planar and including a first side and a second side; and
- a heater structure configured to vaporize the pre-vapor formulation to generate a vapor, the heater structure including,
  - a base wire configured to apply a spring force against the first side of the dispensing interface, and
  - a heater wire coiled around the base wire, the base wire being insulated from the heater wire.

2. The cartridge of claim 1, wherein the dispensing interface includes an absorbent material that is arranged in fluidic communication with the heater structure.

3. The cartridge of claim 1, wherein the heater structure comprises a ring-shape or a C-shape.

4. The cartridge of claim 1, wherein the heater structure comprises a polygonal shape.

5. The cartridge of claim 1, wherein the heater structure comprises a sinusoidal shape.

6. The cartridge of claim 1, wherein the heater structure is in a shape of a toroidal inductor.

7. The cartridge of claim 1, wherein the heater structure has a yield strength ranging from 50 to 600 MPa.

8. The cartridge of claim 1, wherein the base wire has a first diameter, and the heater wire has a second diameter, the first diameter being greater than the second diameter.

9. The cartridge of claim 8, wherein a ratio of the first diameter to the second diameter ranges from 2:1 to 4:1.

10. The cartridge of claim 1, wherein the base wire is an anodized wire.

11. The cartridge of claim 10, wherein the anodized wire is an object wire coated with an anodic layer.

12. The cartridge of claim 11, wherein the object wire is an aluminum wire, a titanium wire, a zinc wire, a magnesium wire, a niobium wire, a zirconium wire, a hafnium wire, or a tantalum wire.

13. The cartridge of claim 11, wherein the anodic layer has a dielectric strength of at least 150 V/m.

14. The cartridge of claim 11, wherein the anodic layer has a thickness ranging from 500 to 10,000 nm.

15. The cartridge of claim 1, wherein the base wire is a transition metal-based wire coated with vitreous enamel.

16. The cartridge of claim 15, wherein the transition metal-based wire is a nickel wire, a nickel-chromium wire, or a stainless steel wire.

17. The cartridge of claim 1, wherein the heater wire has a resistivity ranging from 0.5 to 1.5 $\mu\Omega\cdot m$.

18. The cartridge of claim 1, wherein the heater wire is formed of a nickel-chromium alloy.

* * * * *